United States Patent
Al-Imari et al.

(10) Patent No.: US 10,142,155 B2
(45) Date of Patent: Nov. 27, 2018

(54) APPARATUS AND METHOD FOR TRANSMITTING DATA IN WIRELESS COMMUNICATION SYSTEM

(71) Applicant: Samsung Electronics Co., Ltd., Gyeonggi-do (KR)

(72) Inventors: Mohammed Al-Imari, Middlesex (GB); Belkacem Mouhouche, Middlesex (GB); Maziar Nekovee, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/675,631

(22) Filed: Aug. 11, 2017

(65) Prior Publication Data

US 2018/0048513 A1    Feb. 15, 2018

(30) Foreign Application Priority Data

Aug. 12, 2016 (GB) .................................. 1613847.1

(51) Int. Cl.
*H04L 27/32* (2006.01)
*H04L 27/36* (2006.01)
(Continued)

(52) U.S. Cl.
CPC ............ *H04L 27/362* (2013.01); *H04L 27/02* (2013.01); *H04L 27/12* (2013.01);
(Continued)

(58) Field of Classification Search
CPC ............ H04L 27/3405; H04L 27/3416; H04L 27/345; H04L 27/3461
(Continued)

(56) References Cited

U.S. PATENT DOCUMENTS

2007/0071067 A1*  3/2007  Kwong ................. H04L 1/0025
                                                                    375/130
2008/0089281 A1    4/2008  Yoon et al.
(Continued)

FOREIGN PATENT DOCUMENTS

| WO | 2015070905 A1 | 5/2015 |
| WO | 2015130135 A1 | 9/2015 |
| WO | 2016150348 A1 | 9/2016 |

OTHER PUBLICATIONS

Foreign Communication from Related Counterpart Application; British Patent Application No. 1613347.1; Search and Examination Report from British Patent Office dated Jan. 19, 2017; 5 pages.

(Continued)

*Primary Examiner* — Kevin Kim

(57) ABSTRACT

The present disclosure relates to a pre-$5^{th}$-Generation (5G) or 5G communication system to be provided for supporting higher data rates of Beyond $4^{th}$-Generation (4G) communication system such as Long Term Evolution (LTE). A method for operating a base station in a wireless communication system includes transmitting, to a first terminal, a frequency-quadrature amplitude modulation (FQAM) symbol through a plurality resource units that comprises an active resource unit and at least one inactive resource unit. The method further comprises transmitting, to a second terminal, at least one modulation symbol through the at least one inactive resource unit.

18 Claims, 8 Drawing Sheets

(51) Int. Cl.
*H04L 27/02* (2006.01)
*H04L 27/12* (2006.01)
*H04L 27/20* (2006.01)
*H04B 1/707* (2011.01)

(52) U.S. Cl.
CPC ...... *H04L 27/2003* (2013.01); *H04L 27/2082* (2013.01); *H04B 1/707* (2013.01)

(58) Field of Classification Search
USPC .................................................. 375/298, 303
See application file for complete search history.

(56) References Cited

U.S. PATENT DOCUMENTS

| | | |
|---|---|---|
| 2012/0155480 A1 | 6/2012 | Stenfelt |
| 2013/0058300 A1 | 3/2013 | Perets et al. |
| 2014/0211880 A1* | 7/2014 | Sagong ................ H04L 25/067 375/269 |
| 2014/0269959 A1 | 9/2014 | Lim et al. |
| 2016/0212006 A1 | 7/2016 | Kim et al. |
| 2016/0212737 A1 | 7/2016 | Jang et al. |

OTHER PUBLICATIONS

International Search Report and Written Opinion for International Application No. PCT/KR2017/008732, dated Nov. 20, 2017 (10 pages).

\* cited by examiner

APPARATUS AND METHOD FOR TRANSMITTING DATA IN WIRELESS COMMUNICATION SYSTEM

CROSS-REFERENCE TO RELATED APPLICATION AND CLAIM OF PRIORITY

This application is related to and claims priority to British Patent Application No. 1613847.1 filed on Aug. 12, 2016, the contents of which are incorporated herein by reference.

TECHNICAL FIELD

The present disclosure relates to a wireless communication system, and more particularly to an apparatus and a method for transmitting data in a wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In wireless communication systems, users have different channel conditions. Therefore, different modulation schemes can offer better transmission rates for different users based on the channel conditions experienced by them. In other words, different users in the same cell can experience different channel conditions and, ideally, should have different modulation schemes adapted to their specific requirements. However, what is good for one user, may interfere with another, so it is often difficult to be as specific as desired.

SUMMARY

To address the above-discussed deficiencies, it is a primary object to provide an apparatus and a method for effectively transmitting data in a wireless communication system.

The present disclosure provides an apparatus and a method for improving resource utilization efficiency in a wireless communication system.

The present disclosure provides an apparatus and a method for transmitting modulation symbols to an entity through at least one resource unit that is inactive at another entity in a wireless communication system.

In accordance with an aspect of the present disclosure, a method for operating a base station in a wireless communication system includes, transmitting, to a first terminal, a frequency-quadrature amplitude modulation (FQAM) symbol through a plurality of resource units that comprises an active resource unit and at least one inactive resource unit, and transmitting, to a second terminal, at least one modulation symbol through the at least one inactive resource unit.

In accordance with another aspect of the present disclosure, a base station in a wireless communication system includes a transceiver, and at least one processor coupled to the transceiver. Herein, the transceiver is configured to transmit, to a first terminal, a frequency-quadrature amplitude modulation (FQAM) symbol through a plurality of resource units that comprises an active resource unit and at least one inactive resource unit, and transmit, to a second terminal, at least one modulation symbol through the at least one inactive resource unit.

In accordance with another aspect of the present disclosure, a method of allocating system resources in a wireless communication system, wherein a plurality of substantially similar resources are available for communication between a first system entity and a second system entity, includes, using a first of the plurality of substantially similar system resources to communicate between the first system entity and the second system entity, and using at least a second of the plurality of substantially similar system resources to communicate between the first system entity and a third system entity.

In accordance with an embodiment of the present disclosure, the plurality of substantially similar resources includes resources allocated in one of the following domains: frequency, time or space. The plurality of substantially similar resources include one of, respectively, subcarriers, timeslots or antennas. The wireless communication system is a 5G system, the first system entity is a base station and the second and third system entities are User Equipment (UE). The substantially similar resources are subcarriers, wherein a first subcarrier is activated to communicate from the first system entity to the second system entity using FQAM, and wherein second, third and fourth subcarriers are used to communicate from the first system entity to the third system entity using QAM.

In accordance with an embodiment of the present disclosure, a first transmission power P1 is selected for communication from the first system entity to the second system entity and a second transmission power P2 is selected for communication from the first system entity to the third system entity, wherein P2 is smaller than P1 and the relative levels of P1 and P2 are selected to ensure suitable signal separation of signal received at the second and third system entities.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
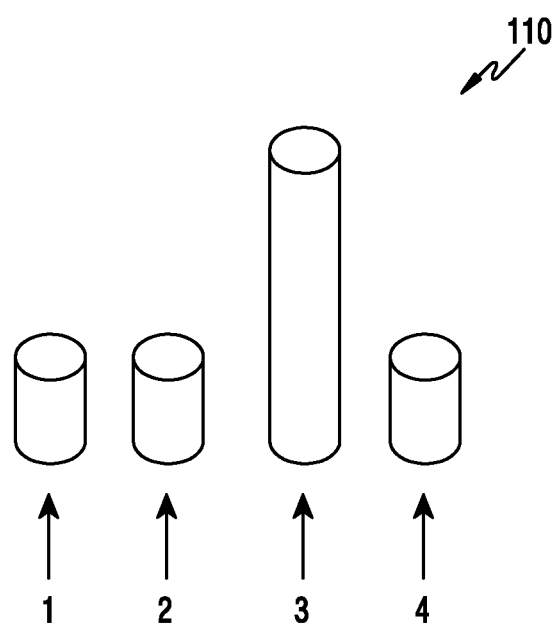
FIG. 1 illustrates a representation of the subcarriers according to various embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for a method for wireless communications, in particular to a method for a downlink transmission scheme that combines frequency-quadrature amplitude modulation (FQAM) with quadrature amplitude modulation (QAM) modulation in a wireless communication system. The method involves the use of inactive subcarriers in FQAM to transmit QAM symbols to a different user. Different power levels are used for the respective FQAM and QAM modulations to maintain the performance of cell-edge users while simultaneously achieving a desirable throughput to the QAM user.

However, in other embodiments, uplink and downlink transmissions can be adapted. Furthermore, sidelink transmissions, where a user equipment (UE) communicates with other users, can benefit from embodiments of the invention.

In the following description, the terms referring to a signal, the terms referring to a channel, the terms referring to control information, the terms referring to a network entity, and the terms referring to elements of a device are used only for convenience of the description. Accordingly, the present disclosure is not limited to the following terms, and other terms having the same technical meaning may be used.

Embodiments of the present disclosure comprise any modulation scheme that utilizes a subset of the available subcarriers, such as subcarrier-index modulation (also known as multicarrier index keying or index modulation) where more than one subcarrier will be active. In other embodiments, other system resources may be used instead of or in addition to subcarriers. Subcarriers are examples of resource units that are associated with the frequency domain, but otherwise unused resource units in other domains may be used similarly. For instance, in the time domain, unused timeslots or symbols (e.g., orthogonal frequency division multiplexing (OFDM) symbols) may be used in the same way as the unused subcarriers, and in the spatial domain, antenna configurations may be adapted to utilize otherwise unused resources.

Although exemplified using FQAM and QAM systems, the skilled person will realize that other schemes may be used in alternative embodiments of the invention. In other systems, for instance, frequency shift keying (FSK) may be used where the active subcarrier is not modulated with a QAM symbol, or in a generalized index modulation system, the number of active subcarriers is not fixed, or in index modulation, a subset of the available antenna is utilized or in generalized space and frequency index modulation, a combination between subcarrier-index modulation and index modulation is performed.

Embodiments of the invention effectively utilize inactive subcarriers in FQAM to serve another user in the system. Preferably, and in particular, the inactive subcarriers are utilized to transmit with a lower power to a user that is close to the base-station or experiencing good channel conditions.

The FQAM is a combination of the FSK and the QAM, which can significantly improve transmission rates for cell-edge users who might otherwise suffer reduced transmission rates. The FQAM carries $Q=\log_2(M_Q)$ information bits by selecting one subcarrier among $M_F$ subcarriers and modulating the selected subcarrier with an $M_Q$-ary QAM constellation, represented by the QAM symbol transmitted in the selected subcarrier. An example of a FQAM symbol is illustrated in FIG. 1.

FIG. 1 illustrates a representation of the subcarriers. Referring FIG. 1, the FQAM symbol 110 occupies 4 subcarriers 1, 2, 3 and 4. The selected subcarrier is depicted as the subcarrier 3, with subcarriers 1, 2 and 4 not being selected. The non-selected subcarriers 1, 2 and 4 ($M_F$-1) are kept inactive/unused in the current time unit, as shown in FIG. 1.

Figure 2:
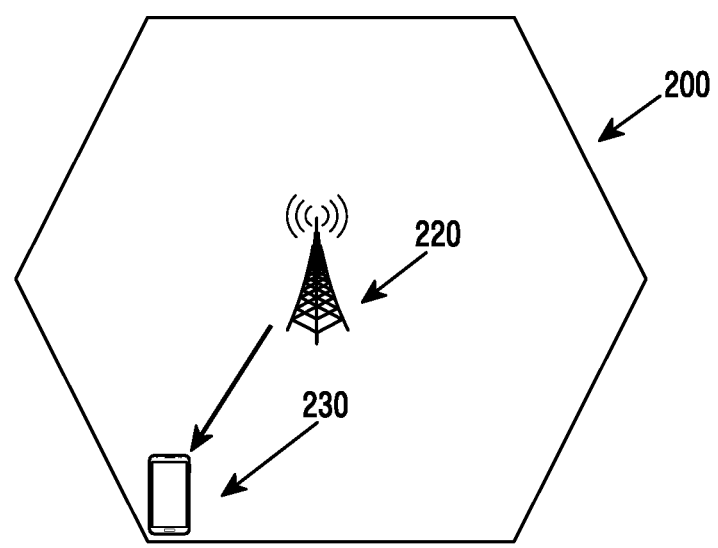
FIG. 2 illustrates a representation of a terminal at the cell-edge according to various embodiments of the present disclosure.

FIG. 2 illustrates a notional cell 200, with a base station 220 at its center. Also shown is a UE 230 located at the cell edge. It is users in this scenario that typically benefit most from FQAM.

Figure 3:
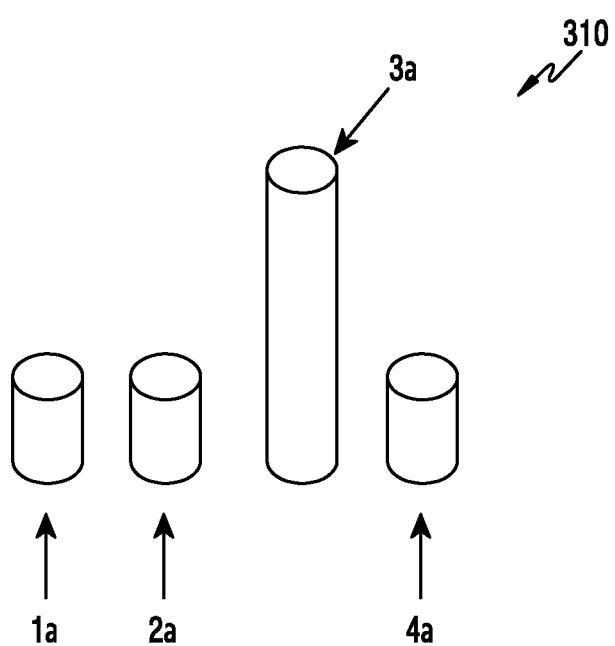
FIG. 3 illustrates a representation of the subcarriers according to various embodiments of the present disclosure.
Figure 4:
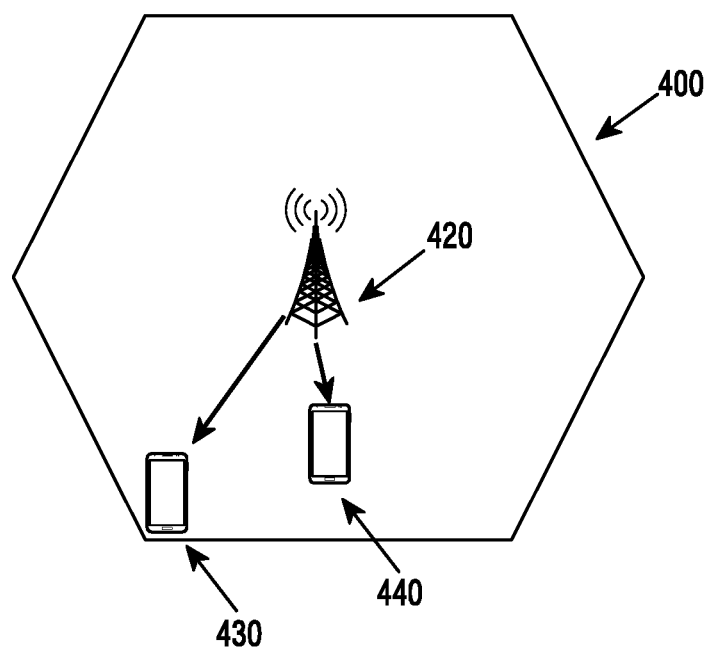
FIG. 4 illustrates a representation of a scenario according to various embodiments of the present disclosure.

FIGS. 3 and 4 illustrate an embodiment of the present disclosure. FIG. 3 illustrates the selected subcarrier 3a and non-selected subcarriers 1a, 2a and 4a subcarriers in a FQAM symbol 310. FIG. 4 illustrates a cell 400, with a base station 420 wirelessly connected to UE 430 at the cell-edge, and to UE 440 nearer to the base station 420. The base station 420 may be referred to as "Access Point (AP)", "eNodeB (eNB)", "gNodeB (gNB), "5th Generation (5G) node", "wireless point", "Transmission/Reception Point (TRP)" as well as "base station". Each of the UEs 430 and 440 may be referred to as "terminal", "mobile station", "subscriber station", "remote terminal", "wireless terminal", or "user device" as well as "UE". According to an embodiment of the present disclosure, the steps involved are as follows:

1. A set of subcarriers are allocated to the UE 430.
2. FQAM modulation is used on these subcarriers to serve the UE 430. Accordingly, one subcarrier out of each $M_F$ subcarriers will be active, e.g. subcarrier 3a in FIG. 3. The rest of the subcarriers ($M_F$-1) are empty/inactive.
3. The rest of subcarriers (i.e. the non-selected ones 1a, 2a, 4a) are used to transmit data (e.g. using QAM symbols) for another user (e.g., the UE 440). A difference in the power levels between the active subcarrier 3a and the UE symbols on the rest of $M_F$-1 subcarriers 1a, 2a and 4a helps in separating the signals at the receivers of the UE 430 and the UE 440.
4. The base station 420 selects the power allocation (P2) for the UE 440, to ensure that the performance of the cell-edge users, such as the UE 430, is not affected as follows:
    (a) Select transmission power level P1 and modulation and coding scheme (MCS) for the user with FQAM modulation (e.g., the UE 430) that guarantee a given system criterion for the UE 430 (and any other cell-edge users), such as block error rate (BLER) threshold. The P1 may be determined based on the modulation and coding level, channel conditions (e.g., channel quality indicator (CQI), large-scale fading) of the UE 430, required BLER and inter-cell interference.
    (b) Select transmission power level P2 and MCS for the user with QAM modulation (the UE 440) that achieve a given system criterion for the UE 440 (such as BLER threshold). The P2 may be determined based on the modulation and coding scheme, channel conditions (e.g., CQI, large-scale fading) of the UE 440 and required BLER.

In various embodiments, the P2 may be smaller than the P1. Further, the P2 should be low enough compared to the P1 to enable the separation of the signals at the receivers of the UE 430 and the UE 440. A level of the P2 should not affect the performance of the UE 430 and other cell-edge users, that use the same resources, by creating high levels of interference or changing the interference distribution.

For instance, the P2 is determined based on a path loss in a channel between the base station 420 and the UE 430. Specifically, the P2 is determined so as a signal (e.g., a QAM symbol) intended for the UE 440 is not reach to the UE 430 or the signal intended for the UE 440 is received to the UE 430 with a received strength under a predefined threshold.

In another embodiment, in order to allow separating signals, precoding is performed on the signal (e.g., the QAM symbol) intended for the UE 440 or a signal (e.g., the FQAM symbol) intended for the UE 430. For instance, a covering code may be applied to the signal intended for the UE 440 or the signal intended for the UE 430. In this case, the UE 430 may eliminate the signal intended for the UE 440.

5. The UE 440 may perform the following:
    (a) detect the active subcarrier that is transmitted to the UE 430 (Subcarrier 3a). The active subcarrier represents interference to the UE 440, since it is related to the FQAM transmission to the UE 430.
    (b) detect the data symbols transmitted on the rest of the subcarriers 1a, 2a and 4a. The data on the 'inactive' subcarriers carry the data for the UE 440.
6. The UE 430 performs single-user detection to detect data transmitted to it, i.e., the index of the active subcarrier 3a and the data transmitted on it. The signals on the 'inactive' subcarriers 1a, 2a and 4a represent interference to the UE 440.

The method, according to an embodiment of the invention, improves the spectral efficiency by utilizing the otherwise inactive subcarriers in FQAM modulation to carry information using an alternative modulation scheme, such as QAM as set out above. Other combinations of modulation schemes could be used, such as those using amplitude shift keying (ASK), phase shift keying (PSK), amplitude-phase shift keying (APSK), continuous phase modulation (CPM), FSK or FQAM could be used instead.

Furthermore, the number of simultaneously supported users with the same resources is increased. In the case of machine type communications (MTC), this can be very good since the number of users increase even if the rate is not very high because of the marginal use of the resources.

Figure 5:
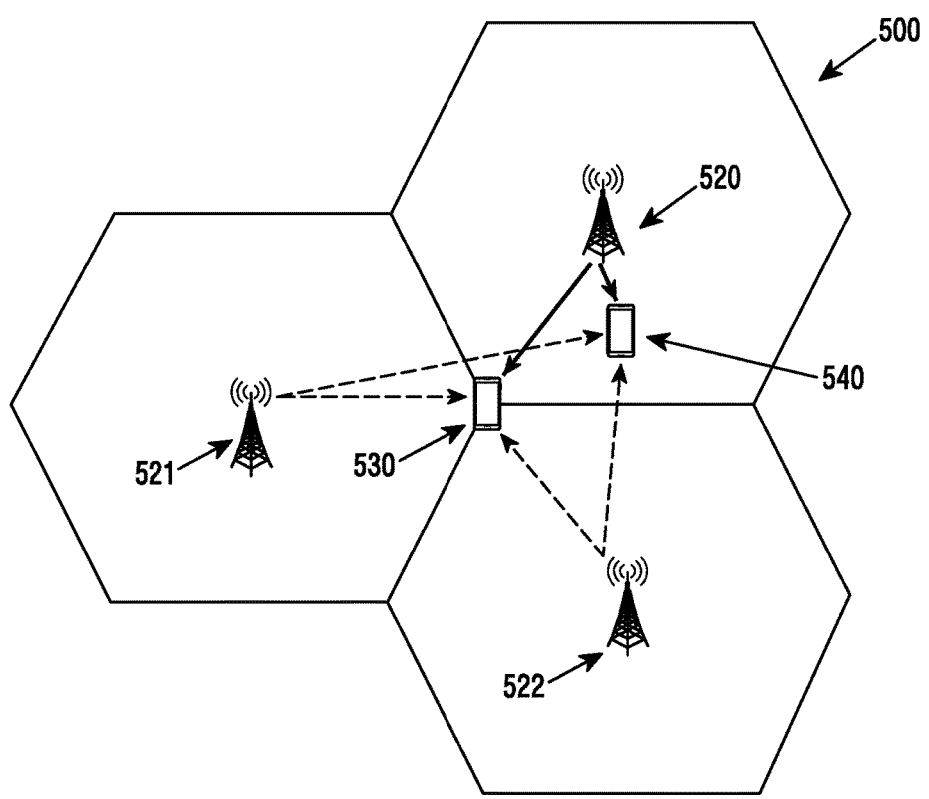
FIG. 5 illustrates a multi-cell scenario according to various embodiments of the present disclosure.

FIG. 5 illustrates a multi-cell scenario where UE 530 and UE 540 are connected to base station 520 and receive transmissions intended for them, represented by the solid lines. However, they will also receive transmissions not intended for them from neighboring base stations 521 and 522. These are shown by the dashed lines. FIG. 5 exemplifies a scenario of three base-stations with one cell-edge user UE 530 that uses FQAM and one cell-center user UE 440 with QAM, as depicted in FIG. 5.

Figure 6:
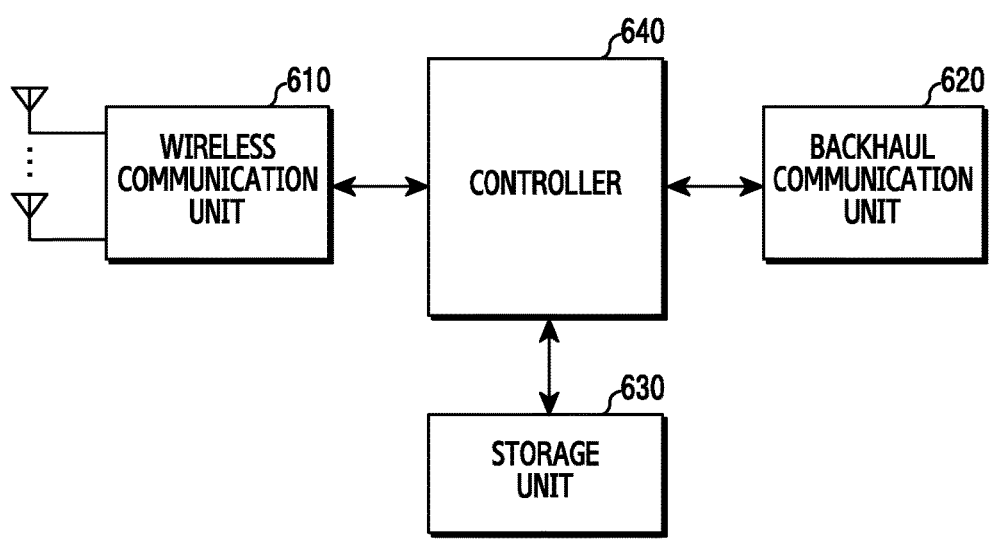
FIG. 6 is a block diagram illustrating a BS in the wireless communication system according to various embodiments of the present disclosure.

FIG. 6 is a block diagram illustrating the base station in the wireless communication system according to various embodiments of the present disclosure. An exemplary structure in FIG. 6 may be understood as a structure of the base station 220, the base station 420, the base station 520, the base station 521 or the base station 522. The term "-unit" or "-er" used hereinafter may refer to the unit for processing at least one function or operation and may be implemented in hardware, software, or a combination of hardware and software.

Referring to FIG. 6, the base station may include a wireless communication unit 610, a backhaul communication unit 620, a storage unit 630, and a controller 640.

The wireless communication unit 610 performs functions for transmitting and receiving signals through a wireless channel. For example, the wireless communication unit 610 may perform a function of conversion between a baseband signal and bitstreams according to a physical layer standard of the system. For example, in data transmission, the wireless communication unit 610 generates complex symbols by encoding and modulating transmission bitstreams. Further, in data reception, the wireless communication unit 610 reconstructs reception bitstreams by demodulating and decoding the baseband signal. In addition, the wireless communication unit 610 up-converts the baseband signal into an Radio Frequency (RF) band signal, transmits the converted signal through an antenna, and then down-converts the RF band signal received through the antenna into the baseband signal.

To this end, the wireless communication unit 610 may include a transmission filter, a reception filter, an amplifier, a mixer, an oscillator, a Digital-to-Analog Convertor (DAC), an Analog-to-Digital Convertor (ADC), and the like. Further, the wireless communication unit 610 may include a plurality of transmission/reception paths. In addition, the wireless communication unit 610 may include at least one antenna array consisting of a plurality of antenna elements. On the hardware side, the wireless communication unit 610 may include a digital unit and an analog unit, and the analog unit may include a plurality of sub-units according to operation power, operation frequency, and the like.

The wireless communication unit 610 transmits and receives the signal as described above. Accordingly, the wireless communication unit 610 may be referred to as a "transmitter", a "receiver", or a "transceiver". Further, in the following description, transmission and reception performed through the wireless channel may be used to have a meaning including the processing performed by the wireless communication unit 610 as described above.

The backhaul communication unit 620 provides an interface for performing communication with other nodes within the network. That is, the backhaul communication unit 620 converts bitstreams transmitted to another node, for example, another access node, another base station, a higher node, or a core network, from the base station into a physical signal and converts the physical signal received from the other node into the bitstreams.

The storage unit 630 stores a basic program, an application, and data such as setting information for the operation of the base station. The storage unit 630 may include a volatile memory, a non-volatile memory, or a combination of volatile memory and non-volatile memory. Further, the storage unit 630 provides stored data in response to a request from the controller 640.

The controller 640 controls the general operation of the base station. For example, the controller 640 transmits and receives a signal through the wireless communication unit 610 or the backhaul communication unit 620. Further, the controller 640 records data in the storage unit 630 and reads the recorded data. To this end, the controller 640 may include at least one processor. For example, the controller 640 may control the base station to perform the operations aforementioned according to various embodiments.

Figure 7:
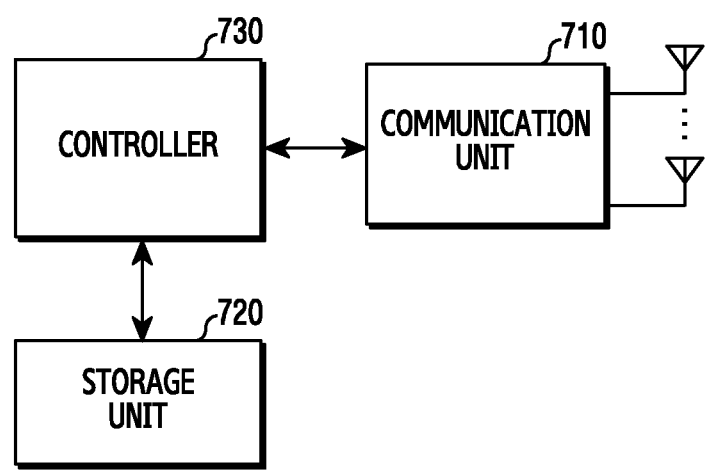
FIG. 7 is a block diagram illustrating a terminal in the wireless communication system according to various embodiments of the present disclosure.

FIG. 7 is a block diagram illustrating the terminal in the wireless communication system according to various embodiments of the present disclosure. An exemplary structure in FIG. 7 may be understood as a structure of the UE 230, the UE 430, the UE 440, the UE 530 or the UE 540. The term "-unit" or "-er" used hereinafter may refer to the unit for processing at least one function or operation, and may be implemented in hardware, software, or a combination of hardware and software.

Referring to FIG. 7, the terminal 120 includes a communication unit 710, a storage unit 720, and a controller 730.

The communication unit 710 performs functions for transmitting/receiving a signal through a wireless channel. For example, the communication unit 710 performs a function of conversion between a baseband signal and bitstreams according to the physical layer standard of the system. For example, in data transmission, the communication unit 710 generates complex symbols by encoding and modulating transmission bitstreams. Also, in data reception, the communication unit 710 reconstructs reception bitstreams by demodulating and decoding the baseband signal. In addition, the communication unit 710 up-converts the baseband signal into an RF band signal, transmits the converted signal through an antenna, and then down-converts the RF band signal received through the antenna into the baseband signal. For example, the communication unit 710 may include a transmission filter, a reception filter, an amplifier, a mixer, an oscillator, a DAC, and an ADC.

Further, the communication unit 710 may include a plurality of transmission/reception paths. In addition, the communication unit 710 may include at least one antenna array consisting of a plurality of antenna elements. In the hardware side, the wireless communication unit 610 may include a digital circuit and an analog circuit (for example, a Radio Frequency Integrated Circuit: RFIC). The digital circuit and the analog circuit may be implemented as one package. The communication unit 710 may include a plurality of RF chains. The communication unit 710 may perform beamforming.

The communication unit 710 transmits and receives the signal as described above. Accordingly, the communication unit 710 may be referred to as a "transmitter", a "receiver", or a "transceiver". Further, in the following description, transmission and reception performed through the wireless channel is used to have a meaning including the processing performed by the communication unit 710 as described above.

The storage unit 720 stores a basic program, an application, and data such as setting information for the operation of the terminal 120. The storage unit 720 may include a volatile memory, a non-volatile memory, or a combination of volatile memory and non-volatile memory. Further, the storage unit 720 provides stored data in response to a request from the controller 730.

The controller 730 controls the general operation of the terminal 120. For example, the controller 730 transmits and receives a signal through the communication unit 710. Further, the controller 730 records data in the storage unit 720 and reads the recorded data. To this end, the controller 730 may include at least one processor or microprocessor, or may play the part of the processor. Further, the part of the communication unit 710 or the controller 730 may be referred to as a Communication Processor (CP). For example, the controller 730 may control the terminal to perform the operations aforementioned according to various embodiments.

Figure 8:
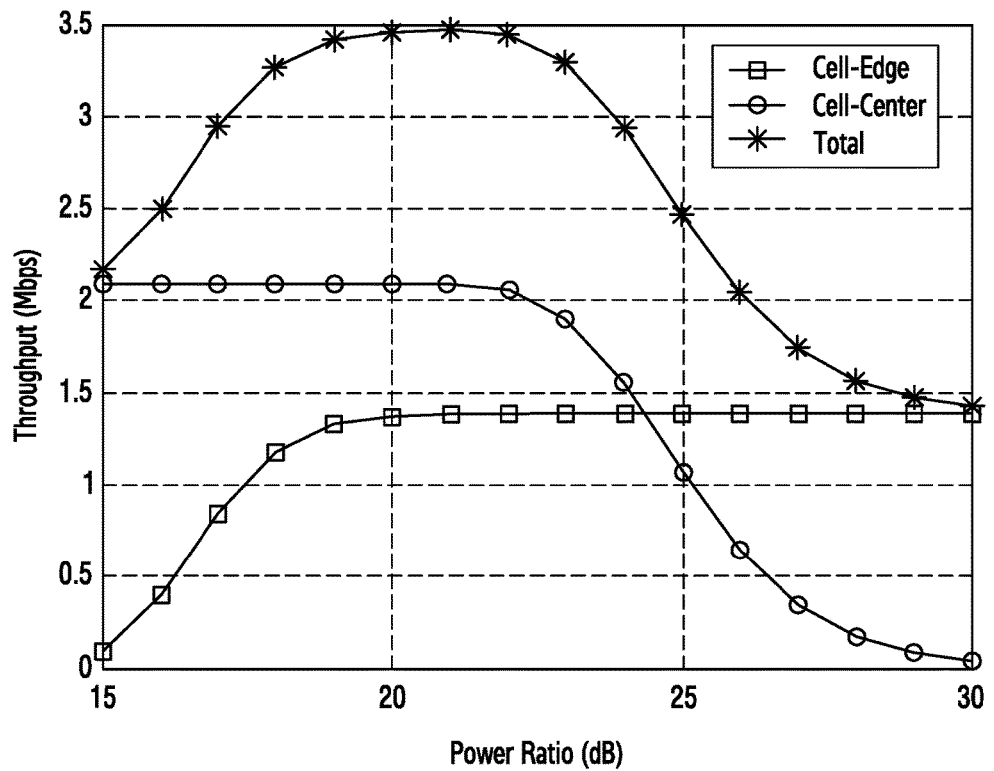
FIG. 8 illustrates a graph demonstrating the effect of power ration on data throughput.

FIG. 8 illustrates a graph of data throughput for users located at the cell edge (such as UE 530), towards the cell center (such as UE 540) and the total throughput from all users in the cell. FIG. 8 illustrates the effect of power allocation to the different users and illustrates that it is possible to optimize the power allocation to serve the cell-center user while making sure the performance of the cell-edge user not affected. FIG. 8 illustrates the users' throughput in the scenario shown in FIG. 5, using different power ratio values (β), where β is defined as β=P1/P2. Although it is not shown in FIG. 8, if P1 is equal or very close to P2 (β~=1), then the two users' (e.g., UEs 530 and 540) performance will be unacceptably poor, since neither UE 530 nor UE 540 will be able to correctly detect the active subcarrier 3a.

Referring FIG. 8 illustrates, for low values of β, the performance of cell-edge users will be significantly affected, due to a low signal to interference and noise ratio (SINR) or a low signal to noise ratio (SNR). Similarly, for very high values of β, the performance of cell-center user will be degraded. On the other hand, for a given range of β values (around 21 dB in the example scenario shown) both users will achieve a desirable performance. In this range of β values, embodiments of the invention can successfully support (by having acceptable throughput) the cell-center user without affecting the performance of the cell-edge user. The system throughput can be increased by up to 150% using an embodiment of the invention comparing to a prior art approach of not utilizing the inactive subcarriers in FQAM.

Advantageously, embodiments of the present disclosure are able to make use of resources which are otherwise not used and, so, wasted. This otherwise spare capacity can be used to boost overall data throughput for a particular cell, boosting user experience and optimizing overall network performance.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a base station in a wireless communication system, the method comprising:
   transmitting, on a first resource unit, a first symbol generated based on frequency-quadrature amplitude modulation (FQAM) using a plurality of resource units that comprises the first resource unit and a second resource unit to a first terminal; and
   transmitting, on the second resource unit, a second symbol generated based on a modulation scheme different from the FQAM to a second terminal.

2. The method of claim 1, wherein the plurality of resource units comprises resources allocated in one of a frequency domain, a time domain or a spatial domain.

3. The method of claim 1, wherein the plurality of resource units comprises one of a plurality of subcarriers, a plurality of symbols, a plurality of timeslots, or a plurality of antennas.

4. The method of claim 1, wherein the second symbol is generated based on amplitude shift keying (ASK), phase shift keying (PSK), amplitude-phase shift keying (APSK), continuous phase modulation (CPM), frequency shift keying (FSK) or the FQAM.

5. The method of claim 1, further comprising:
   wherein the first symbol is transmitted to the first terminal with a first transmission power,
   wherein the second symbol is transmitted to the second terminal with a second transmission power, and
   wherein the second transmission power is smaller than the first transmission power.

6. The method of claim 5, wherein relative levels of the first transmission power and the second transmission power are determined to allow a signal separation of signal received at the first terminal and the second terminal.

7. The method of claim 5, wherein the second transmission power is determined based on a path loss in a channel between the base station and the first terminal.

8. The method of claim 5, further comprising:
   performing precoding on the first symbol or the second symbol in order to eliminate the second symbol at the first terminal.

9. The method of claim 1, wherein the first terminal or the second terminal is a machine type communications (MTC) user equipment (UE).

10. A base station in a wireless communication system, the base station comprising:
   a transceiver; and
   at least one processor coupled to the transceiver, wherein the transceiver is configured to:

transmit, on a first resource unit, a first symbol generated based on frequency-quadrature amplitude modulation (FQAM) using a plurality of resource units that comprises the first resource unit and a second resource unit to a first terminal; and transmit, on the second resource unit, a second symbol generated based on a modulation scheme different from the FQAM to a second terminal.

11. The base station of claim 10, wherein the plurality of resource units comprises resources allocated in one of a frequency domain, a time domain or a spatial domain.

12. The base station of claim 10, wherein the plurality of resource units comprises one of a plurality of subcarriers, a plurality of symbols, a plurality of timeslots, or a plurality of antennas.

13. The base station of claim 10, wherein the second symbol is generated based on amplitude shift keying (ASK), phase shift keying (PSK), amplitude-phase shift keying (APSK), continuous phase modulation (CPM), frequency shift keying (FSK) or the FQAM.

14. The base station of claim 10, wherein the first symbol is transmitted to the first terminal with a first transmission power, wherein the second symbol is transmitted to the second terminal with a second transmission power, and wherein the second transmission power is smaller than the first transmission power.

15. The base station of claim 14, wherein relative levels of the first transmission power and the second transmission power are determined to allow a signal separation of signal received at the first terminal and the second terminal.

16. The base station of claim 14, wherein the second transmission power is determined based on a path loss in a channel between the base station and the first terminal.

17. The base station of claim 14, wherein the at least one processor is configured to:

perform precoding on the first symbol or the second symbol in order to eliminate the second symbol at the first terminal.

18. The base station of claim 10, wherein the first terminal or the second terminal is a machine type communications (MTC) user equipment (UE).

* * * * *